G. A. RAKOWSKY.
DUMPING DEVICE.
APPLICATION FILED AUG. 5, 1907.
899,682.
Patented Sept. 29, 1908.
2 SHEETS—SHEET 1.
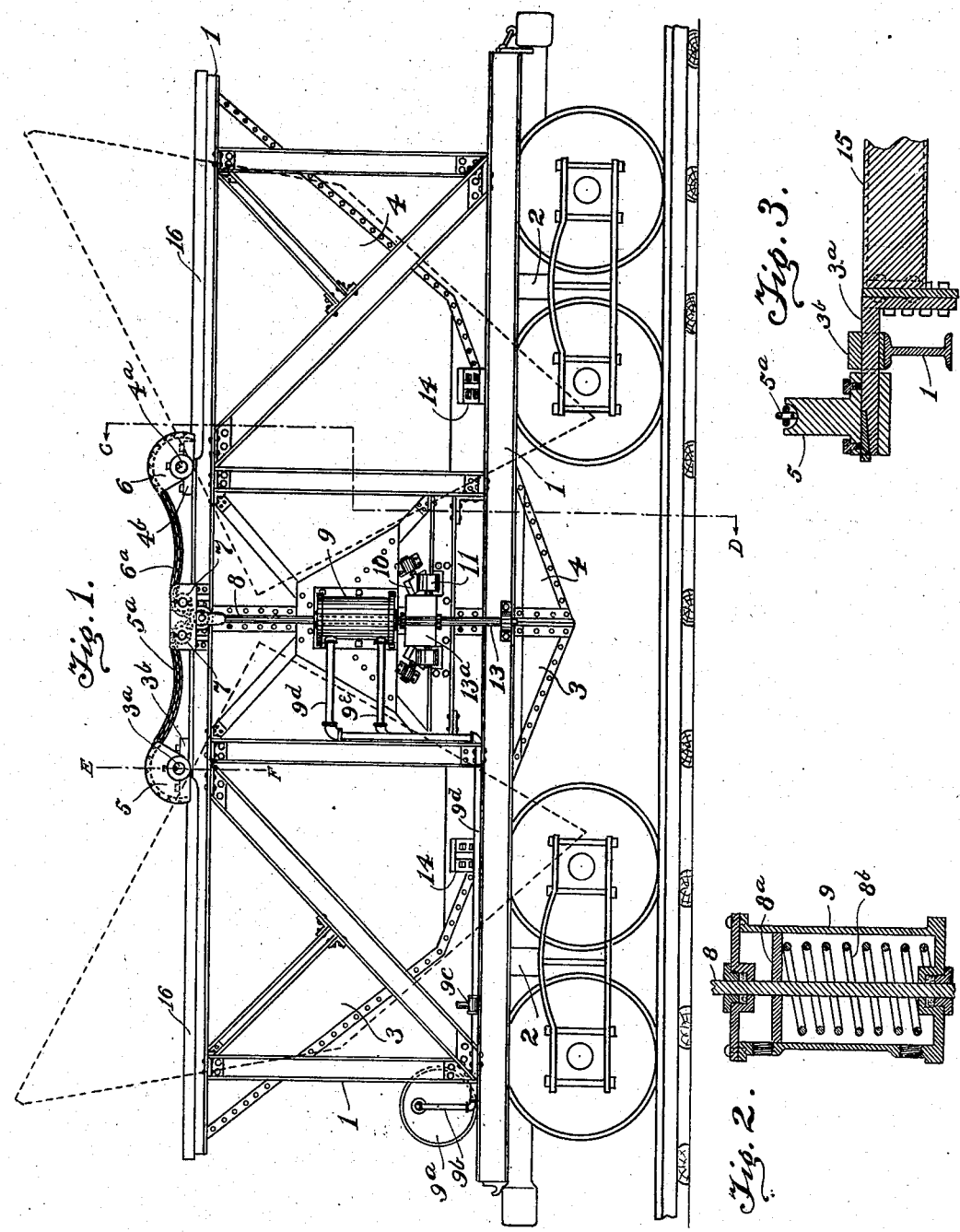
Witnesses:
Inventor
Gustav A. Rakowsky
By his Attorney
James T. Watson

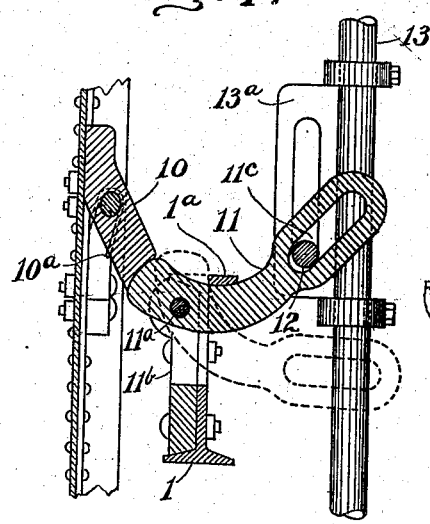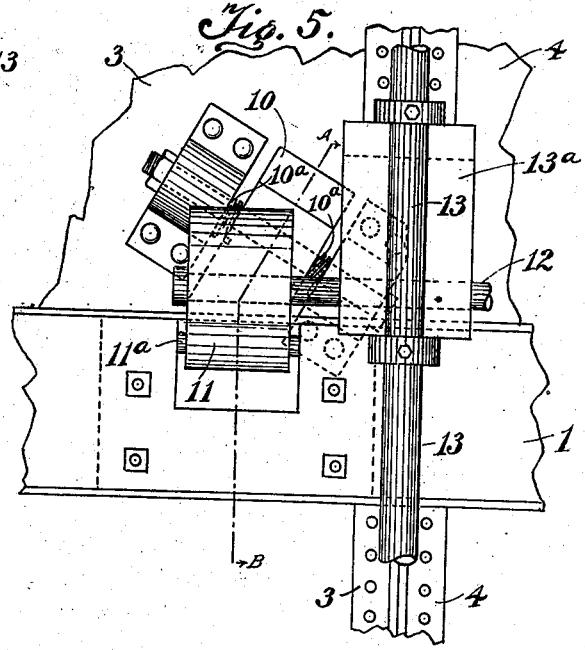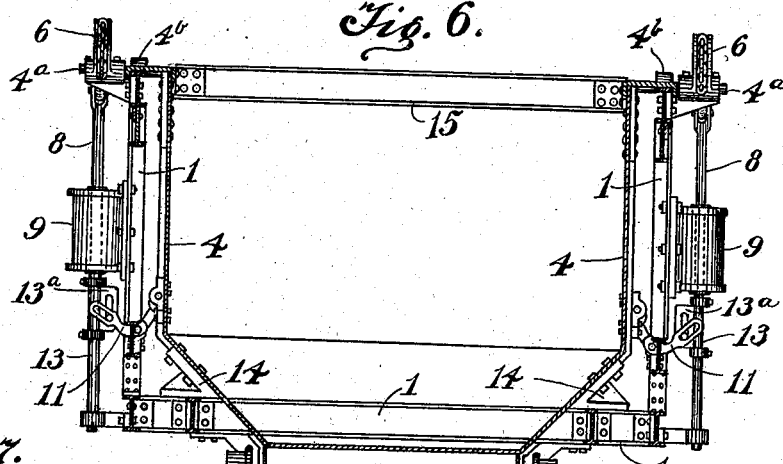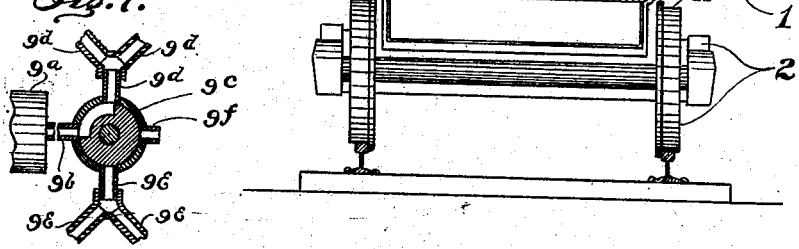

UNITED STATES PATENT OFFICE.

GUSTAV A. RAKOWSKY, OF DULUTH, MINNESOTA, ASSIGNOR OF ONE-THIRD TO VICTOR RAKOWSKY AND ONE-THIRD TO CHARLES S. OLSON, BOTH OF DULUTH, MINNESOTA.

DUMPING DEVICE.

No. 899,682.　　　　　Specification of Letters Patent.　　　　Patented Sept. 29, 1908.

Application filed August 5, 1907. Serial No. 387,074.

*To all whom it may concern:*

Be it known that I, GUSTAV A. RAKOWSKY, a citizen of the United States, residing at Duluth, in the county of St. Louis and State of Minnesota, have invented certain new and useful Improvements in Dumping Devices; and I do hereby declare the following to be a full, clear, and exact description of the invention, such as will enable others skilled in the art to which it appertains to make and use the same.

My invention relates to load dumping devices, and has for its object the provision of a convenient holding and dumping device adapted to receive and hold and preferably to transport a load of earth, ore, or other more or less comminuted material and adapted to be easily dumped.

It consists of the constructions, combinations and arrangements of parts hereinafter described and claimed.

In the drawings, Figure 1, is a side elevation of a car embodying my invention. Fig. 2, is a vertical longitudinal central section through a piston cylinder embodied in my invention. Fig. 3, is a vertical transverse section of a portion of my invention, on the line E—F of Fig. 1. Fig. 4, is a transverse section of a portion of my invention, on the line A—B of Fig. 5. Fig. 5, is a detail of portions of the frame, buckets, and locking devices forming parts of my said invention. Fig. 6, is a transverse section of my said invention, on the line C—D of Fig. 1. Fig. 7, is a central vertical sectional view of a four-way valve forming part of my said invention.

In the drawings, 1, is a frame of any suitable construction, dimensions, proportions, or material; preferably of rigid skeleton formation, and preferably mounted upon anti-friction supports of any suitable construction, as upon wheeled trucks 2. Two buckets, 3 and 4, respectively, are pivotally supported upon said frame in any suitable manner or by any suitable transversely directed pivoting means, as by means of the trunnions $3^a$ and $4^a$, respectively, which are secured to said buckets and extend through bearings $3^b$ and $4^b$ upon said frame. Said buckets are open at their tops and inner ends and are closed at their bottoms and outer ends, and in closed position the inner ends of said buckets abut against each other so that, together, said buckets in closed position form, in effect, one receptacle open only at the top. The trunnions of each of said buckets are preferably positioned inwardly of the central vertical transverse plane of gravity of the bucket, so that, normally, the buckets will remain in closed position whether loaded or empty; but this may not be essential, especially after the buckets have been locked in closed position, at which time the load may be piled up in the center so as to throw the transverse central plane of gravity of each bucket and its contents inwardly of the trunnions.

Secured directly, or indirectly to each bucket are one or more levers of any suitable structure, as the segments 5 and 6, keyed to the shafts $3^a$ and $4^a$, respectively, comprising a portion of the means for tilting said buckets into open position in the event that they do not tilt wholly by gravity when released by the locking means provided to support them in closed position. These levers may be operated in a variety of ways or by various means within the scope and spirit of certain of my claims, but preferably I secure to the outward end of the segments flexible means as, for example, chains $5^a$ and $6^a$, respectively, which flexible means are carried inwardly over the respective segments and over guide rollers 7 mounted on said frame, and said flexible means are at their inner ends attached directly or indirectly to piston rods, as 8, which are adapted to be operated by pistons $8^a$ contained in the piston cylinders 9, which cylinders are mounted on said frame 1.

A reservoir of any suitable power supply, as the compressed air cylinder $9^a$, located at any suitable point, as upon one end of the frame 1, communicates with said piston cylinders as follows: A main pipe $9^b$ extends from said reservoir into a four-way valve $9^c$. From said valve extends a pipe $9^d$ branched so as to communicate through one branch with the upper end of one cylinder and so as to communicate through the other branch with the upper end of the other cylinder. From said valve also extends a pipe $9^e$ branched so as to communicate through one branch with the lower end of the one cylinder and so as to communicate through the other branch with the lower end of the other cylinder. From said valve also extends an exhaust opening $9^f$ communicating with the free atmosphere. Said valve may therefore be operated to admit power to the upper ends of both cylinders, or to the lower ends of both cylinders, or to cut off the power supply and to open the exhaust from either the upper or the lower ends of both cylinders. I also preferably insert in said cylinders below the pistons coiled springs $8^b$, which, under ordinary conditions, will raise the pistons without the necessity of introducing air or steam beneath them, and the air or steam is thus economized. The descending pistons through the mediums of the flexible means, haul upon the levers 5 and 6 and cause them to tilt the inner ends of the buckets downwardly upon their pivots so that their inward open ends will be directed downwardly to discharge the load.

In order to support and lock the buckets in closed position so that they may receive and retain the load, even when the center of gravity is inward of the trunnions, I provide the following described means.

Upon each side of each bucket, I pivot a finger 10, the upper end of which, above the pivot, is adapted, in operative position, to bear against the side of the bucket, and the lower end of which, from the plane of the longitudinal axis of said pivot, extends transversely outward and downward and at its lower end is cylindrically concaved on substantially the same radius as the free end of the dog 11, hereinafter described. Pivotally mounted on the frame 1 at each side of each bucket, as by the pivot $11^a$ turning in bearings $11^b$, is a dog 11, having a free end or nose directed, in operative position, toward the lower end of the adjoining finger 10 and, in operative position, adapted to engage said finger, the free end or nose of said dog being cylindrically convexed concentrically with said pivot $11^a$. The opposite end or heel of said dog is slotted as at $11^c$ to receive a pin 12 which is directed there-through. Said pin 12 extends preferably through both dogs on the same side of the device and may therefore be embodied in the locking means of both buckets, whereas a separate dog 11 and finger 10 is required or preferred for each bucket. Extending downward from said pistons are piston rods 13 carrying vertically slotted lugs $13^a$, through which slots said pins 12 also extend. Upon the descent of the pistons 13 the upper ends of the slotted lugs $13^a$ strike the pins 12 with a hammer-like blow which is communicated to the heels of the dogs and operates to force the dogs out of engagement with said fingers, the noses of the dogs moving upwardly on an arc concentric with said pivots $11^a$, and also concentric with the dog-engaging concaves of said fingers. At the same time or closely subsequent thereto a pull is preferably exerted upon the levers 5 and 6 to tilt or aid in tilting the buckets, the inner ends of which thereupon tilt downwardly to discharge the load. The load having been discharged, the buckets will swing to closed position by gravity, the center of gravity of the empty buckets being outward of the trunnions. After the buckets have been tilted to discharging position, the valve should be operated to exhaust the air or steam from the cylinders, whereupon the springs $8^b$ below the pistons will raise the same, thus—through the intermediate means hereinbefore described—effecting the return of the dogs to locking position. The heels of the dogs cannot rise higher than locking position, because of suitable stops as $1^a$ formed on or secured to the frame and extending over the heels of said dogs. When, therefore, the buckets swing back to closed position, the fingers 10 will yield at their lower ends, oscillating on their pivots, so as to pass into engaging position with relation to said dogs. In order to throw the lower ends of said fingers yielding outward into engaging position, I provide the springs $10^a$ each of which bears at one end against the side of the respectively adjoining bucket, and at the other end bears against the lower end of the respectively adjoining finger.

It will of course be observed that when the transverse plane of the center of gravity, is inward of the trunnions, a part of the weight will be carried by said fingers and dogs and their pivots and bearings, thus relieving the trunnions of over strain during transit of the receptacle when embodied in or mounted upon a car. I also provide the lugs 14 secured to the sides of the buckets in a transverse vertical plane outward of the transverse vertical plane in which the trunnions are positioned, which lugs are adapted, in operative, position to bear upon the frame so as to carry part of the weight of the buckets when said buckets are in closed position, and so as to carry a part of the weight of buckets and load when the center of gravity of the load is outward of the trunnions.

Across the top of each bucket, preferably in line with the trunnions, I insert a stiffening beam 15, preferably a channel beam, which beam is secured to the opposite side walls of the bucket and tends to prevent either bulging or buckling of the side walls. There are also preferably provided channel flanges 16 at the upper edges of the side walls of the buckets, outwardly of the trunnions, which flanges are adapted to overhang the upper edges of the sides of the frame and, when the buckets are in closed position, to engage said frame and prevent injurious swaying of the buckets in said frame. A minute degree of swaying may however if desired be provided for in the bearings of said trunnions in order to avoid an undesirable amount of friction between said flanges and said frame when the buckets are to be tilted.

My invention is especially adapted to use in dump cars and is primarily intended for such use. There has heretofore been great difficulty, involving a very large waste of time and labor in dumping ore cars designed to discharge through their floors, when the ore or earth therein has been frozen, or when it has become so packed as to form a bridge, or arch, over the discharge openings. Under such circumstances the ore must be thawed out, or rammed from the top, or both. The ramming frequently results in packing the ore tighter and making the arch stronger, and in such cars it has been impractical to undermine the key of the arch. The expense incident to unloading a car under such conditions has been exceedingly great, and in ramming the ore the lives and limbs of the laborers are not infrequently jeopardized. To avoid these difficulties, it will be observed that I have, in my invention, abandoned the trap door principle of discharge and have, in a minor degree, approached the clam-shell bucket principle, whereby I secure a relatively larger discharge opening, and a discharging floor of very steep angle without sacrificing any of the load capacity of the car or buckets.

In using my invention, if the ore should by any chance become bridged over the opening, it can be attacked from the side by long crow bars and quickly undermined or dislodged. It will be observed that the discharge opening of a car provided with floor doors could not be constructed as long as the discharge opening of my car, unless the trucks were made of great and undesirable height, for the reason that the lowered floor doors would strike the track, especially if the doors broke loose when the car was in transit.

The advantages of my invention will thus be apparent.

What I claim is,

1. In a dumping device, the combination with suitable frame, of two buckets supported thereon and adapted to tilt in a vertical plane, each of said buckets being entirely open at its inner end, means for supporting the inner ends of said buckets in non tilted position, means for releasing the latter said supporting means, said buckets being adapted when empty to be returned by gravity to non-tilted position, the floors of said buckets being adapted to contact with each other when said buckets are in non-tilted position, and means for tilting the inner ends of said buckets downwardly.

2. In a dumping device, the combination with a suitable frame, of a bucket mounted thereon and adapted to tilt in a vertical plane, said bucket being closed at one end and open at the opposite end, said bucket being provided at its closed end with means adapted to overhang and engage said frame and depend downwardly at the outside thereof when said bucket is in non-tilted position and to disengage from said frame when said bucket is tilting.

3. In a dumping device, the combination of a suitable frame, a bucket pivotally mounted on said frame and adapted to tilt downwardly at one end and upwardly at its opposite end, said downwardly tilting end being open, said upwardly tilting end being provided with an outwardly and downwardly extending flange extending along its sides for a part of the length of said bucket, said flange being adapted to overhang and receive in the concave of its angle a portion of said frame and to engage the same when said bucket is in normal non-tilted position, and to disengage therefrom when the upwardly tilting end of said bucket is tilting upwardly.

4. In a load dumping receptacle, the combination with a suitable supporting frame, of two oppositely disposed buckets pivotally mounted thereon and adapted to closely approach each other at their inner ends in closed position and adapted at their inner ends to swing downwardly in divergent arcs to open position, means for tilting said buckets, and means for locking said buckets in closed position said latter means including fingers pivotally secured to the sides of the buckets near the inner ends of said buckets, said fingers above the axis of rotation of their pivots being adapted in operation to bear against the sides of the buckets respectively and being adapted below the axis of rotation of their pivots to diverge from the sides of said buckets, dogs pivotally mounted on said frame and in operative position adapted at their noses to engage the lower ends of said fingers, and means adapted to hold said dogs in operative position, said holding means being adapted to be retracted to disengage said dogs from operative position so as to permit said buckets to swing downward at their inner ends.

5. In a load dumping receptacle, the combination of a suitable frame, two oppositely disposed buckets pivotally supported thereon and adapted to closely approach each other at their inner ends and adapted to tilt from closed position downwardly at their inner ends through divergent arcs, means for tilting said buckets, means for locking said buckets in closed position, said latter means including fingers extending at a downward incline from said buckets and cylindrically recessed in their lower ends, dogs pivotally mounted on said frame and each provided with a convex nose opposed to one of said fingers and struck on a radius approximately equal in length to the radius of the recess in the lower end of the opposing said finger, said dogs being adapted in operative position to engage said fingers, said dogs having vertically inclined slotted apertures at their heels, a pin extending through said apertures and through a vertically slotted lug carried by a piston rod or its equivalent, means for operating said piston-rod to force down the heels of said dogs so as to disengage them from said fingers and permit the inner ends of the buckets to swing downward into open or load-discharging position.

6. In a dumping device, the combination of a support, a tiltable receptacle open at one end, mounted upon said support, means for tilting the open end of said receptacle downwardly, means for supporting the open end of said receptacle in raised normal position as distinguished from its downwardly tilted position, said receptacle being adapted to be returned by gravity to said normal position.

In testimony whereof I hereunto affix my signature, in presence of two witnesses.

GUSTAV A. RAKOWSKY.

Witnesses:
JAMES T. WATSON,
C. T. CRANDALL.